US012687980B2

(12) United States Patent
Zhang et al.

(10) Patent No.: US 12,687,980 B2
(45) Date of Patent: Jul. 21, 2026

(54) DATA PROCESSING METHOD AND APPARATUS

(71) Applicant: Huawei Technologies Co., Ltd., Shenzhen (CN)

(72) Inventors: Chenxu Zhang, Shenzhen (CN); Xiaodong Luo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 35 days.

(21) Appl. No.: 18/591,561

(22) Filed: Feb. 29, 2024

(65) Prior Publication Data

US 2024/0201890 A1 Jun. 20, 2024

Related U.S. Application Data

(63) Continuation of application No. PCT/CN2022/113098, filed on Aug. 17, 2022.

(30) Foreign Application Priority Data

Sep. 1, 2021 (CN) .......................... 202111022655.5

(51) Int. Cl.
*G06F 3/06* (2006.01)

(52) U.S. Cl.
CPC ............ *G06F 3/065* (2013.01); *G06F 3/0619* (2013.01); *G06F 3/0679* (2013.01)

(58) Field of Classification Search
CPC ...... G06F 3/065; G06F 3/0619; G06F 3/0679; G06F 11/1004; G06F 15/17221; H04L 67/1097
See application file for complete search history.

(56) References Cited

U.S. PATENT DOCUMENTS

| | | | | |
|---|---|---|---|---|
| 10,001,933 B1* | 6/2018 | Johnson | ................ | G06F 3/0665 |
| 2006/0179217 A1* | 8/2006 | Ito | ........................ | G06F 11/1076 |
| | | | | 711/112 |
| 2013/0297854 A1* | 11/2013 | Gupta | ................. | G06F 11/1441 |
| | | | | 711/E12.008 |
| 2015/0248249 A1* | 9/2015 | Amidi | ................... | G06F 3/0688 |
| | | | | 711/103 |
| 2017/0052723 A1* | 2/2017 | Voigt | ........................ | G06F 9/06 |
| 2018/0004920 A1* | 1/2018 | Murakami | ............ | H04L 12/281 |
| 2019/0294582 A1* | 9/2019 | Zhu | ..................... | H04L 67/1097 |
| 2019/0303159 A1 | 10/2019 | Fryman et al. | | |
| 2020/0326091 A1* | 10/2020 | Shin | ........................ | F24F 11/84 |
| 2020/0326971 A1* | 10/2020 | Yang | ................... | G06F 9/45558 |
| 2021/0081401 A1* | 3/2021 | Khatami | ............ | G06F 16/2379 |

FOREIGN PATENT DOCUMENTS

CN 114817121 A 7/2022

* cited by examiner

*Primary Examiner* — Hiep T Nguyen
(74) *Attorney, Agent, or Firm* — Slater Matsil, LLP

(57) ABSTRACT

This disclosure related a data processing method and apparatus. The method includes: A processor or a network interface card of a client generates a first copy and a second copy of data. The network interface card of the client writes the first copy into a first address in a memory of a storage device and the second copy into a second address in the memory in a one-time unilateral remote memory access RDMA manner. Alternatively, a network interface card of the storage device respectively writes the first copy and the second copy of the data into the first address and the second address in the memory according to a unilateral RDMA write request sent by the client.

20 Claims, 7 Drawing Sheets

Before a write command is executed

| 1234 | CRC1 |
|------|------|
| Data 1 | Check code 1 |

First address

| 1234 | CRC1 |
|------|------|
| Data 1 | Check code 1 |

Second address

An interrupt event occurs before a first copy of second target data "4321 CRC2" is written into the first address

After the interrupt event occurs

| 1234 | CRC1 |
|------|------|
| Data 1 | Check code 1 |

First address

| 1234 | CRC1 |
|------|------|
| Data 1 | Check code 1 |

Second address

FIG. 4

Before a write command is executed

| 1234 | CRC1 |
|------|------|
| Data 1 | Check code 1 |

First address

| 1234 | CRC1 |
|------|------|
| Data 1 | Check code 1 |

Second address

An interrupt event occurs in a process of writing a first copy of second target data "4321 CRC2" into the first address

After the interrupt event occurs

| 4334 | CRC1 |
|------|------|
| Data 1 | Check code 1 |

First address

| 1234 | CRC1 |
|------|------|
| Data 1 | Check code 1 |

Second address

FIG. 5

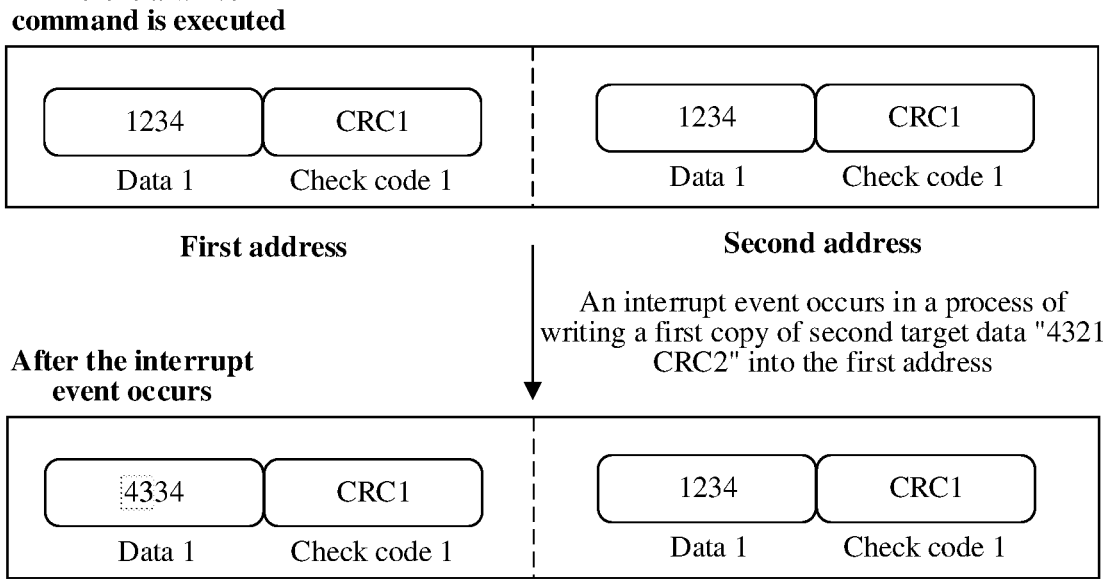

Before a write command is executed

After an interrupt event occurs

After an interrupt event occurs

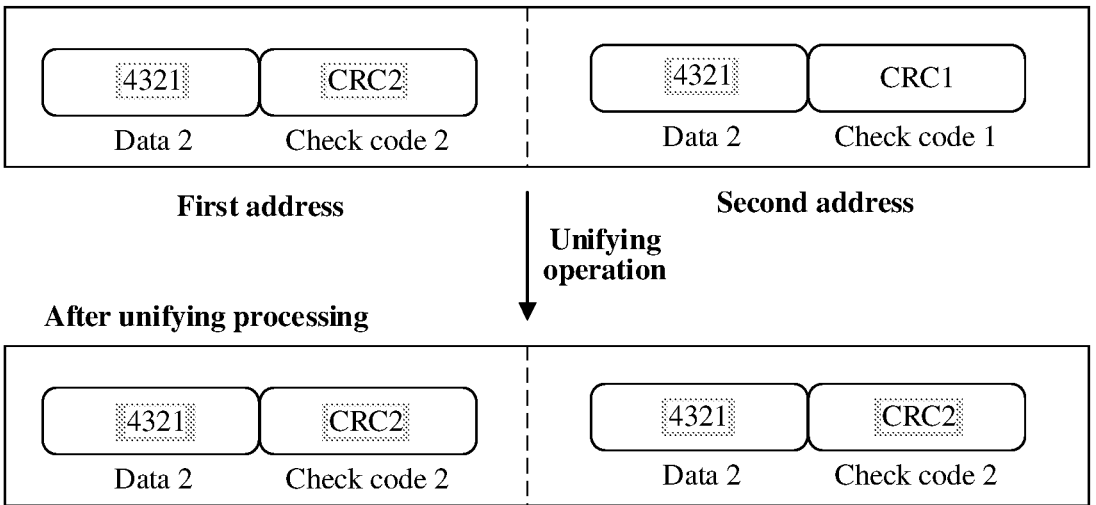

First address                                    Second address

Unifying
operation

After unifying processing

First address                                    Second address

FIG. 10

```
┌──────────┐                              ┌────────────────┐
│  Client  │                              │ Storage device │
└──────────┘                              └────────────────┘
```

S201: The client sequentially writes two copies of second target data
into a first address and a second address in a memory of the storage
device based on a unilateral RDMA technology S202: If an interrupt event occurs in a data writing
process, detect content stored in the first address and
content stored in the second address S203: When detecting that the content stored in the
first address is different from the content stored in the
second address, perform a unifying operation on the
content stored in the first address and the content
stored in the second address

FIG. 11

```
          ┌──────────────┐                              ┌──────────────────┐
          │    Client    │                              │  Storage device  │
          └──────────────┘                              └──────────────────┘
```

S301: A processor or a network interface card of the client
generates a first copy and a second copy of data S302: The network interface card of the client writes the first copy into a first
address in a memory of the storage device and the second copy into a second
address in the memory in a one-time unilateral RDMA manner S3021: Unilateral RDMA write request S3022: A network interface card of the storage device writes
the first copy into the first address and the second copy into the
second address according to the unilateral RDMA write request S303: A processor or the network interface card of the storage device
reads the first copy from the first address and the second copy from
the second address, checks a read first copy and a read second copy,
and when detecting that the read first copy is inconsistent with the
read second copy, performs a data overwrite operation on data stored
in the first address or data stored in the second address S304: The network interface card reads the
first copy from the first address and the second
copy from the second address in the unilateral
RDMA manner S305: The processor or the network interface card checks a
read first copy and the read second copy, and determines
valid data from the read first copy and the read second copy

FIG. 12

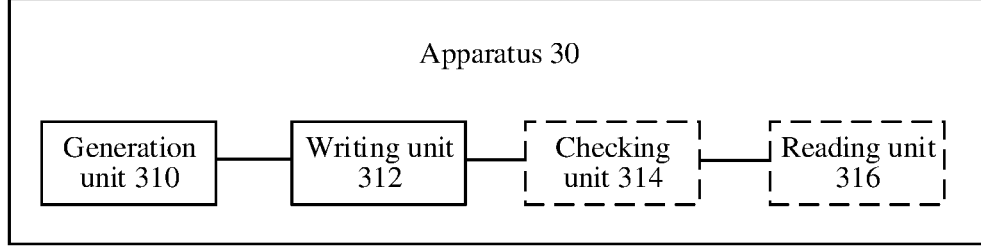

FIG. 13

DATA PROCESSING METHOD AND APPARATUS

CROSS-REFERENCE TO RELATED APPLICATIONS

This application is a continuation of International Application No. PCT/CN2022/113098, filed on Aug. 17, 2022, which claims priority to Chinese Patent Application Chinese Patent Application No. 202111022655.5, filed on Sep. 1, 2021. The disclosures of the aforementioned applications are hereby incorporated by reference in their entireties.

TECHNICAL FIELD

This application relates to the field of data storage, and in particular, to a data processing method and apparatus.

BACKGROUND

To resolve a problem of data tearing due to a power failure or the like in a process of writing data into a storage medium, in other words, that some data is successfully written and some data fails to be written, a two-time submission manner, a three-time submission manner, and the like are proposed to ensure atomicity of data writing, so that all data carried in a write request of a current time is written or not written.

However, in both the two-time submission manner and the three-time submission manner, to-be-written data is persistently stored in a log-based manner. This results in large input/output (I/O) overheads and long network round-trip time, and reduces performance of a storage system.

SUMMARY

This application discloses a data processing method and apparatus, to implement atomicity of data writing, reduce I/O overheads, and improve performance of a storage system.

According to a first aspect, this application provides a data processing method, where the method includes: A processor or a network interface card of a client generates a first copy and a second copy of data, where the processor communicates with the network interface card. The network interface card writes the first copy into a first address in a memory of a storage device and the second copy into a second address in the memory in a one-time unilateral remote memory access RDMA manner.

The network interface card of the client writes the data into the memory of the storage device by using unilateral RDMA. This avoids access of operating systems of both parties in a data writing process, and this can reduce consumption of bandwidth and computing power of the memory in the data writing process, and improve data writing efficiency.

In the foregoing method, the network interface card of the client implements continuous dual write of the first copy and the second copy of the data into the memory of the storage device by using a one-time unilateral RDMA technology, in other words, writes the first copy into the first address in the memory of the storage device, and after the first copy is written into the first address, writes the second copy into the second address in the memory. This reduces I/O overheads during data writing, reduces a data writing delay, and effectively improves performance of a storage system.

Optionally, the memory is a persistent memory.

In the foregoing implementation, the persistent memory can improve a speed and efficiency of data reading and writing by the client, and implement persistence of stored data.

Optionally, the method further includes: The network interface card reads the first copy from the first address and the second copy from the second address in the unilateral RDMA manner. The processor or the network interface card checks the read first copy and the read second copy, and determines valid data from the read first copy and the read second copy.

In the foregoing implementation, the processor or the network interface card of the client may further verify validity or integrity of the first copy read from the first address and the second copy read from the second address, to obtain the valid data from the first copy and the second copy for use.

Optionally, that the processor or the network interface card checks the read first copy and the read second copy, and determines the valid data from the read first copy and the read second copy is specifically: When detecting that the read first copy is the same as the read second copy, the processor or the network interface card determines that the read first copy and the read second copy are the valid data.

That the read first copy is the same as the read second copy includes any one of the following two implementations.

In specific implementation, the read first copy is the same as the first copy of the data, and the read second copy is the same as the second copy of the data. In this case, it indicates that the first copy of the data has been successfully written into the first address in the memory, and the second copy of the data has been successfully written into the second address in the memory. In this way, the processor or the network interface card of the client determines that the read first copy and the read second copy are the valid data. This ensures atomicity of the data writing.

In another specific implementation, the read first copy is the same as initial data stored in the first address in the memory, and the read second copy is the same as initial data stored in the second address in the memory, where the initial data stored in the first address is data stored in the first address before the first copy of the data is written into the first address in the memory, the initial data stored in the second address is data stored in the second address before the second copy of the data is written into the second address in the memory, and the initial data stored in the first address is the same as the initial data stored in the second address. In this way, the processor or the network interface card of the client determines that the read first copy and the read second copy are the valid data. This ensures the atomicity of the data writing.

According to a second aspect, this application provides a data processing method. The method includes: A network interface card of a storage device receives a unilateral remote memory access RDMA write request sent by a client, where the unilateral RDMA write request includes a first copy and a second copy of data, a first address of the first copy in a memory of the storage device, and a second address of the second copy in the memory. The network interface card writes the first copy into the first address and the second copy into the second address.

In the foregoing method, the network interface card of the storage device implements continuous dual write of the first copy of the data and the second copy of the data in the memory of the storage device in a one-time unilateral RDMA manner, in other words, after the first copy is written into the first address in the memory, the second copy is written into the second address in the memory. This reduces I/O consumption, reduces a data writing delay, and effectively improves storage system performance.

Optionally, the memory is a persistent memory.

In the foregoing implementation, the persistent memory can improve a speed and efficiency of data reading and writing by the client, and implement persistence of stored data.

Optionally, the method further includes: The network interface card or a processor of the storage device reads the first copy from the first address and the second copy from the second address. The network interface card or the processor of the storage device checks the read first copy and the read second copy, and when detecting that the read first copy is inconsistent with the read second copy, performs a data overwrite operation on data stored in the first address or data stored in the second address.

In the foregoing implementation, when detecting that the read first copy is inconsistent with the read second copy, the network interface card or the processor of the storage device may perform the data overwrite operation, so that the data stored in the first address is the same as the data stored in the second address. This implements atomicity of data writing.

Optionally, the read first copy includes first data and first check code, the read second copy includes second data and second check code, and the read first copy is inconsistent with the read second copy when at least one of the following conditions is met: the first data is different from the second data, or the first check code is different from the second check code.

That the first data is different from the second data means that content of the first data is different from content of the second data. That the first check code is different from the second check code means that content of the first check code is different from content of the second check code.

In specific implementation, a length of the first data is the same as a length of the second data, and a length of the first check code is the same as a length of the second check code.

Optionally, that the data overwrite operation is performed on the data stored in the first address or the data stored in the second address includes: When checking of the first data based on the first check code succeeds, the first data and the first check code overwrite the data stored in the second address.

In the foregoing implementation, that the checking of the first data based on the first check code succeeds indicates that the read first copy is complete and valid, that is, the data stored in the first address is complete and valid. Therefore, the first data and the first check code overwrite the data stored in the second address, so that the data stored in the first address is completely the same as the data stored in the second address. This implements the atomicity of the data writing.

Optionally, that the data overwrite operation is performed on the data stored in the first address or the data stored in the second address includes: When checking of the first data based on the first check code fails and checking of the second data based on the second check code succeeds, the second data and the second check code overwrite the data stored in the first address.

In the foregoing implementation, that the checking of the first data based on the first check code fails indicates that data tearing occurs in the read first copy, in other words, data tearing occurs in the data stored in the first address. That the checking of the second data based on the second check code succeeds indicates that the read second copy is complete and valid, that is, the data stored in the second address is complete and valid. Therefore, the second data and the second check code overwrite the data stored in the first address, so that the data stored in the first address is completely the same as the data stored in the second address. This implements the atomicity of the data writing.

Optionally, the method further includes: When detecting that the read first copy is consistent with the read second copy, the network interface card or the processor of the storage device determines that the read first copy and the read second copy are valid data.

In the foregoing implementation, the processor or the network interface card of the storage device may further verify validity or integrity of the first copy read from the first address and the second copy read from the second address, to obtain the valid data from the first copy and the second copy for use.

According to a third aspect, this application provides a data processing apparatus, where the apparatus includes: a generation unit, configured to generate a first copy and a second copy of data; and a writing unit, configured to write the first copy into a first address in a memory of a storage device and the second copy into a second address in the memory in a one-time unilateral remote memory access RDMA manner.

Optionally, the memory is a persistent memory.

Optionally, the apparatus further includes: a reading unit, configured to read the first copy from the first address and the second copy from the second address in the unilateral RDMA manner; and a checking unit, configured to: check the read first copy and the read second copy, and determine valid data from the read first copy and the read second copy.

Optionally, the checking unit is specifically configured to: when detecting that the read first copy is the same as the read second copy, determine that the read first copy and the read second copy are the valid data.

According to a fourth aspect, this application provides a data processing apparatus, where the apparatus includes: a receiving unit, configured to receive a unilateral remote memory access RDMA write request sent by a client, where the RDMA write request includes a first copy and a second copy of data, a first address of the first copy in a memory of a storage device, and a second address of the second copy in the memory; and a writing unit, configured to write the first copy into the first address and the second copy into the second address.

Optionally, the memory is a persistent memory.

Optionally, the apparatus further includes: a reading unit, configured to read the first copy from the first address and the second copy from the second address; and a processing unit, configured to: check the read first copy and the read second copy, and when detecting that the read first copy is inconsistent with the read second copy, perform a data overwrite operation on data stored in the first address or data stored in the second address.

Optionally, the read first copy includes first data and first check code, the read second copy includes second data and second check code, and the read first copy is inconsistent with the read second copy when at least one of the following conditions is met: the first data is different from the second data, or the first check code is different from the second check code.

Optionally, the processing unit is specifically configured to: when checking of the first data based on the first check code succeeds, overwrite, by using the first data and the first check code, the data stored in the second address.

Optionally, the processing unit is specifically configured to: when checking of the first data based on the first check code fails and checking of the second data based on the second check code succeeds, overwrite, by using the second data and the second check code, the data stored in the first address.

Optionally, the processing unit is specifically configured to: when detecting that the read first copy is consistent with the read second copy, determine that the read first copy and the read second copy are valid data.

According to a fifth aspect, this application provides an apparatus, where the apparatus includes at least one processor and a network interface card, and the processor communicates with the network interface card. The processor or the network interface card is configured to generate a first copy and a second copy of data. The network interface card is configured to write the first copy into a first address in a memory of a storage device and the second copy into a second address in the memory in a one-time unilateral remote memory access RDMA manner.

Optionally, the memory is a persistent memory.

Optionally, the network interface card is further configured to read the first copy from the first address and the second copy from the second address in the unilateral RDMA manner. The processor or the network interface card is further configured to: check the read first copy and the read second copy, and determine valid data from the read first copy and the read second copy.

Optionally, that the processor or the network interface card is further configured to: check the read first copy and the read second copy, and determine valid data from the read first copy and the read second copy includes: When further detecting that the read first copy is the same as the read second copy, the processor or the network interface card determines that the read first copy and the read second copy are the valid data. The apparatus may be a chip or an integrated circuit, or may be the apparatus according to the third aspect.

According to a sixth aspect, this application provides an apparatus. The apparatus includes a network interface card and a memory. The network interface card is configured to receive a unilateral remote memory access RDMA write request sent by a client, where the unilateral RDMA write request includes a first copy and a second copy of data, a first address of the first copy in the memory, and a second address of the second copy in the memory. The network interface card is configured to write the first copy into the first address and the second copy into the second address.

Optionally, the memory is a persistent memory.

Optionally, the data processing apparatus further includes a processor. The processor communicates with the network interface card. The network interface card or the processor is configured to read the first copy from the first address and the second copy from the second address. The network interface card or the processor is further configured to: check the read first copy and the read second copy, and when detecting that the read first copy is inconsistent with the read second copy, perform a data overwrite operation on data stored in the first address or data stored in the second address.

Optionally, the read first copy includes first data and first check code, the read second copy includes second data and second check code, and the read first copy is inconsistent with the read second copy when at least one of the following conditions is met: the first data is different from the second data, or the first check code is different from the second check code.

Optionally, that the data overwrite operation is performed on the data stored in the first address or the data stored in the second address includes: When checking of the first data based on the first check code succeeds, the first data and the first check code overwrite the data stored in the second address.

Optionally, that the data overwrite operation is performed on the data stored in the first address or the data stored in the second address includes: When checking of the first data based on the first check code fails and checking of the second data based on the second check code succeeds, the second data and the second check code overwrite the data stored in the first address.

Optionally, the network interface card or the processor is further configured to: when detecting that the read first copy is the same as the read second copy, determine that the read first copy and the read second copy are valid data. The apparatus may be a chip or an integrated circuit, or may be the apparatus according to the fourth aspect.

According to a seventh aspect, this application provides a computer-readable storage medium, including computer instructions. When the computer instructions are run by a processor, the method in any one of the first aspect or the possible implementations of the first aspect is implemented.

According to an eighth aspect, this application provides a computer-readable storage medium, including computer instructions. When the computer instructions are run by a processor, the method in any one of the second aspect or the possible implementations of the second aspect is implemented.

According to a ninth aspect, this application provides a computer program product. When the computer program product is executed by a processor, the method in any one of the first aspect or the possible implementations of the first aspect is implemented. For example, the computer program product may be a software installation package. If the method provided in any possible design of the first aspect needs to be used, the computer program product may be downloaded and executed on the processor, to implement the method in any one of the first aspect or the possible implementations of the first aspect.

According to a tenth aspect, this application provides a computer program product. When the computer program product is executed by a processor, the method in any one of the second aspect or the possible implementations of the second aspect is implemented. For example, the computer program product may be a software installation package. If the method provided in any possible design of the second aspect needs to be used, the computer program product may be downloaded and executed on the processor, to implement the method in any one of the second aspect or the possible implementations of the second aspect.

BRIEF DESCRIPTION OF THE DRAWINGS

FIG. 4 is a schematic diagram of an interrupt event occurring before data is written into a first address according to an embodiment of this application;

FIG. 5 is a schematic diagram of an interrupt event occurring in a process of writing data into a first address according to an embodiment of this application;

FIG. 10 is a schematic diagram of another unifying operation according to an embodiment of this application;

FIG. 11 is a flowchart of another data processing method according to an embodiment of this application;

FIG. 12 is a flowchart of still another data processing method according to an embodiment of this application;

FIG. 13 is a schematic diagram of a functional structure of an apparatus according to an embodiment of this application;

DETAILED DESCRIPTION OF ILLUSTRATIVE EMBODIMENTS

The terms used in embodiments of this application are merely for the purpose of illustrating specific embodiments, and are not intended to limit this application. In this specification and the claims in embodiments of this application, terms such as "first", "second", and the like are intended to distinguish between different objects but do not indicate a particular order of the objects.

When an event such as a power failure or a system breakdown occurs in a process of writing data into a storage medium (for example, a memory or a hard disk drive HDD), a part of the data is successfully written, and another part of the data fails to be written. As a result, the data in the storage medium is torn.

Figures 1, 2, 3:
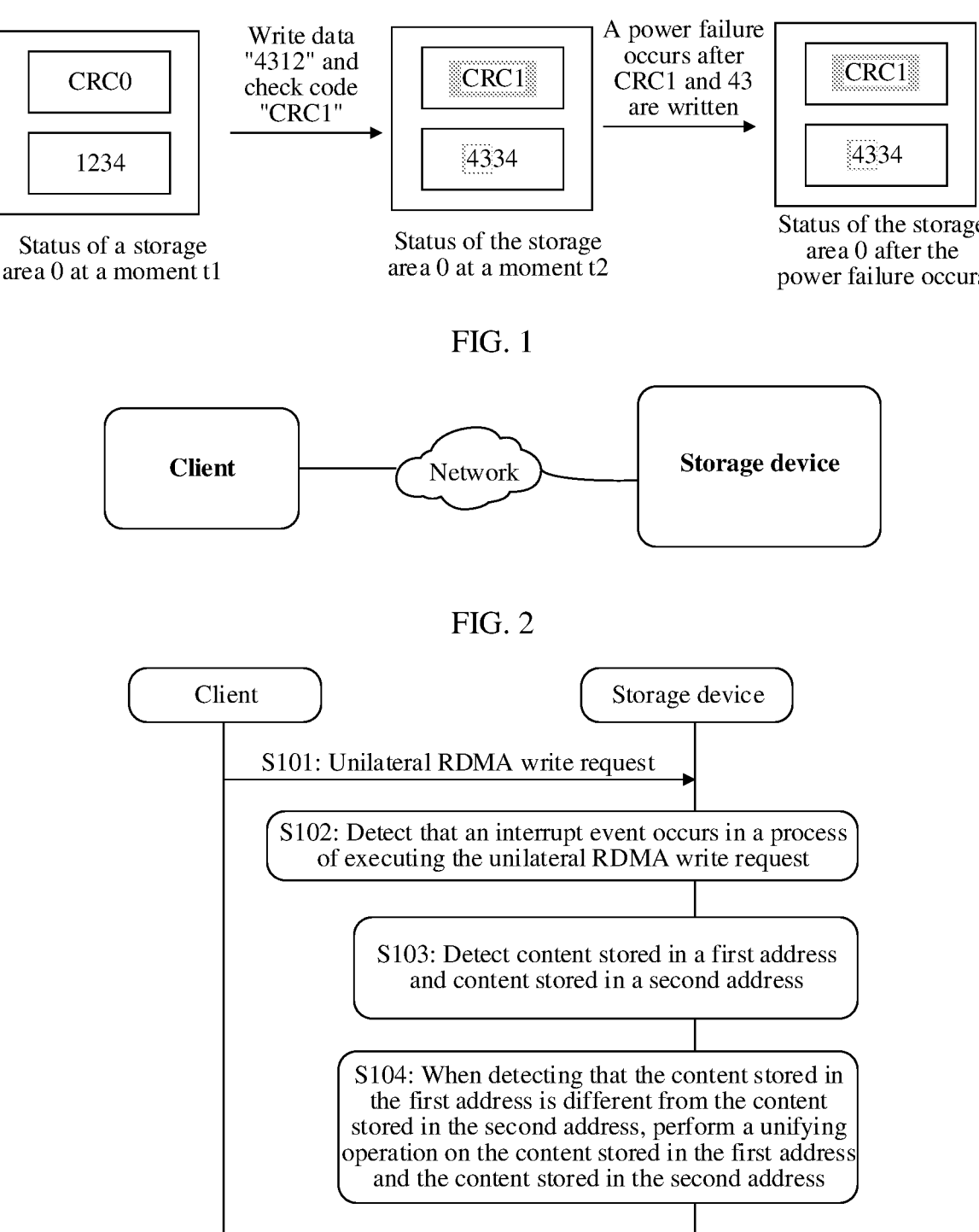
FIG. 1 is a schematic diagram of data tearing in a data writing process.
FIG. 2 is a schematic diagram of a system architecture according to an embodiment of this application.
FIG. 3 is a flowchart of a data processing method according to an embodiment of this application.

FIG. 1 is a schematic diagram of data tearing in a data writing process. As shown in FIG. 1, at a moment t1, data "1234" and check code "CRC0" are stored in a storage area 0. If a client intends to write data "4312" and check code "CRC1" into the storage area 0 at this moment, and a power failure occurs in a system after the check code "CRC1" and data "43" are successfully written at a moment t2, after the power failure, data stored in the storage area 0 changes to "4334", and stored check code is "CRC1". Therefore, it can be learned that only some data "43" in the data "4312" is successfully written. As a result, data tearing occurs.

After the client initiates a remote direct memory access (Remote Direct Memory Access, RDMA) write operation to the storage area 0 of a storage device to write the data "4312", if writing succeeds, the data "4312" and the check code "CRC1" are stored in the storage area 0, which is equivalent to that all data is written successfully. If the writing fails, it is expected that the storage area 0 still stores the data before the write operation, that is, the data "1234" and the check code "CRC0", which is equivalent to that all data fails to be written. If it may be ensured that all data is successfully written or not successfully written, that is, no data tearing occurs, atomicity of data writing is ensured.

In a possible embodiment, an atomicity problem of the data writing may be resolved in a two-time submission manner. For example, an application first writes to-be-written data/metadata into a log file instead of directly writing the data/metadata. In this process, the log file may be referred to as a log. The data/metadata in the log file is subsequently written for a second time to perform persistent writing. For example, writing of data/metadata in a target file is triggered once based on a preset periodicity. This process is referred to as a checkpoint or commit. If the power failure or the system breakdown occurs during this process, a file system may analyze the log after restart, and re-execute a commit operation that fails to be executed in the log until the commit is successfully executed.

It can be learned that, in the foregoing manner of resolving the atomicity problem of the data writing, I/O needs to be used for a plurality of times to execute writing of same data, and I/O overheads are large. In addition, an application in a distributed memory system causes a plurality of times of network round-trip consumption and reduces system performance.

For the foregoing problem, embodiments of this application provide a data writing method. Each time data needs to be written into memory space of the storage device, continuous dual writing is performed on the data through one-time I/O, and the atomicity of the data writing with less I/O consumption is ensured by using two pieces of memory space. This helps improve the system performance.

The following describes technical solutions of this application with reference to the accompanying drawings.

FIG. 2 shows an example of a schematic diagram of a system architecture. The system is used to implement atomic writing of data. As shown in FIG. 2, the system includes a client and a storage device. The client and the storage device are connected and communicate with each other by using a network. The network may be a wide area network, a local area network, or the like. This is not specifically limited in this embodiment of this application.

In specific implementation, the client is configured to send a unilateral RDMA write request to the storage device, where the unilateral RDMA write request indicates the storage device to respectively write to-be-written data into two addresses in a memory of the storage device continuously. The storage device is configured to: write the to-be-written data according to the unilateral RDMA write request, and perform processing such as checking on data in the two addresses, to ensure atomicity of writing the to-be-written data. It should be noted that the memory may be a persistent memory (Persistent Memory, PMEM).

In another specific implementation, the client may respectively write the to-be-written data in the two addresses into the memory (for example, the PMEM) of the storage device continuously in a unilateral RDMA manner, and the storage device is configured to perform the processing such as the checking on the data in the two addresses. This can reduce a data writing delay and improve system performance.

In some possible embodiments, the system shown in FIG. 2 may be a distributed persistent memory system. In this case, there are a plurality of clients shown in FIG. 2, and there are also a plurality of storage devices shown in FIG. 2. Any one of the plurality of clients may communicate with the plurality of storage devices, that is, the client may send a write instruction to at least one storage device.

It should be noted that FIG. 2 is merely an example of an architectural diagram, but a quantity of network elements included in the system shown in FIG. 2 is not limited. Although not shown in FIG. 2, another functional entity may further be included in FIG. 2 in addition to the functional entity shown in FIG. 2. In addition, the method provided in embodiments of this application may be applied to the communication system shown in FIG. 2. Certainly, the method provided in embodiments of this application may also be applied to another communication system. This is not limited in embodiments of this application.

When the client performs a data write operation on an address in the memory of the storage device, ensuring atomicity of data writing means: if the data write operation is successfully performed, data in the address is target data; or if the data write operation fails to be performed, data stored in the address is still data stored before a moment at which the data write operation is performed. Based on this idea, a data writing method is proposed to implement the atomicity of the data writing based on as little I/O consumption as possible.

FIG. 3 is a flowchart of a data processing method according to an embodiment of this application. Atomicity of data writing can be implemented based on as few I/O overheads as possible, to reduce network round-trip overheads and improve system performance. The method includes but is not limited to the following steps.

S101: A client sends a unilateral RDMA write request to a storage device.

In this embodiment of this application, first target data is stored in a first address in a memory of the storage device, and the first target data is also stored in a second address. Data stored in the first address is the same as data stored in the second address. An address of the first address is different from an address of the second address.

In this embodiment of this application, the first target data includes data 1 and check code 1. The check code 1 corresponds to the data 1, the check code 1 uniquely indicates integrity and correctness of the data 1, and the data 1 may be checked based on the check code 1. For example, the first target data may be "1234 CRC1", where "1234" is referred to as the data 1, and "CRC1" is referred to as the check code 1.

In this embodiment of this application, the unilateral RDMA write request includes two copies of second target data (in other words, a first copy of the second target data and a second copy of the second target data), the first address of the first copy of the second target data in the memory of the storage device, and the second address of the second copy of the second target data in the memory. The unilateral RDMA write request indicates the storage device to write the first copy of the second target data into the first address and the second copy of the second target data into the second address. The two copies of the second target data are completely the same.

In this embodiment of this application, the second target data includes data 2 and check code 2. The data 2 in the second target data corresponds to the check code 2. In other words, the check code 2 uniquely indicates correctness and integrity of the data 2, and the data 2 may be checked based on the check code 2. For example, the second target data may be "4321 CRC2", where "4321" is referred to as the data 2, and "CRC2" is referred to as the check code 2.

In this embodiment of this application, a length of the second target data is the same as a length of the first target data, but content of the second target data is different from content of the first target data. Specifically, that the length of the second target data is the same as the length of the first target data means that a length of the data 2 is equal to a length of the data 1, and a length of the check code 2 is equal to a length of the check code 1. That the content of the second target data is different from the content of the first target data means that content of the data 2 is different from content of the data 1, and content of the check code 2 is different from content of the check code 1.

In this embodiment of this application, the storage device sequentially and respectively writes the two copies of the second target data into the first address and the second address in the memory of the storage device. Respectively writing means: writing the first copy of the second target data in the two copies of the second target data into the first address to overwrite the first target data in the first address, and writing the second copy of the second target data in the two copies of the second target data into the second address to overwrite the second target data in the second address. Sequentially writing means: first writing the first copy of the second target data into the first address, and after the first copy of the second target data is successfully written into the first address, writing the second copy of the second target data into the second address.

In this embodiment of this application, there may be two results of writing, by the storage device, the first copy of the second target data into the first address in the storage device. A first result is that the storage device successfully writes the first copy of the second target data into the first address. A second result is that the storage device fails to write the first copy of the second target data into the first address.

That the storage device successfully writes the first copy of the second target data into the first address means that the first copy of the second target data completely overwrites the first target data in the first address. Specifically, the data 2 in the first copy of the second target data completely overwrites the data 1 in the first target data in the first address, and the check code 2 in the first copy of the second target data completely overwrites the check code 1 in the first target data in the first address. Otherwise, the storage device fails to write the first piece of the second target data into the first address. Similarly, for a case in which the storage device successfully writes or fails to write the second copy of the second target data into the second address, respectively refer to related descriptions that the storage device successfully writes or fails to write the first copy of the second target data into the first address. Details are not described herein again.

In this embodiment of this application, an entity in the storage device that performs a data write operation may be specifically a network interface card of the storage device.

It should be noted that, in the foregoing example, a writing sequence of the data 2 and the check code 2 in the second target data is not limited. For example, the first copy of the second target data is written into the first address. In the first copy of the second target data, the data 2 may be written into the first address before the check code 2, or the check code 2 may be written into the first address before the data 2, or the data 2 and the check code 2 may be written into the first address at the same time. This is not specifically limited in this embodiment of this application.

In this embodiment of this application, the client may perform a copy operation on the first copy of the second target data to obtain the second copy of the second target data.

S102: The storage device detects that an interrupt event occurs in a process of executing the unilateral RDMA write request.

In this embodiment of this application, the interrupt event may be a power failure event, a system breakdown event, a fault event, or the like.

In this embodiment of this application, when the interrupt event occurs in a process in which the storage device executes the unilateral RDMA write request, content stored in the first address and content stored in the second address include the following several cases.

Case 1: The interrupt event occurs before the first copy of the second target data is written into the first address. In this case, the content stored in the first address is the same as the content stored in the second address. Specifically, after the storage device receives the unilateral RDMA write request, and when the storage device is about to start to write the first copy of the second target data into the first address, the interrupt event occurs. In this case, both the content stored in the first address and the content stored in the second address remain the first target data.

For example, FIG. 4 is a schematic diagram of the interrupt event occurring before the data is written into the first address according to an embodiment of this application. In FIG. 4, before the unilateral RDMA write request is executed, the content stored in the first address is the first target data "1234 CRC1", and the content stored in the second address is also the first target data "1234 CRC1". If the interrupt event occurs when the first copy of the second target data "4321 CRC2" is written into the first address, after the interrupt event occurs, the content stored in the first address is still the first target data "1234 CRC1", and the content stored in the second address is also the first target data "1234 CRC1".

Case 2: The interrupt event occurs in a process of writing the first copy of the second target data into the first address. In this case, the content stored in the first address is different from the content stored in the second address. Specifically, when the storage device is writing a part of the first copy of the second target data into the first address, the interrupt event occurs. In this case, the first target data stored in the first address is partially changed, and the content stored in the second address remains the first target data.

If the storage device first writes the data 2 and then writes the check code 2 when writing the first copy of the second target data into the first address, that the first target data stored in the first address is partially changed may include the following cases: (1) The data 2 is partially written into the first address, and the check code 2 is not written into the first address. (2) All the data 2 is written into the first address, and the check code 2 is not written into the first address. (3) All the data 2 is written into the first address, and the check code 2 is partially written into the first address.

If the storage device first writes the check code 2 and then writes the data 2 when writing the first copy of the second target data into the first address, that the first target data stored in the first address is partially changed may include the following cases: (1) The check code 2 is partially written into the first address, and the data 2 is not written into the first address. (2) All the check code 2 is written into the first address, and the data 2 is not written into the first address. (3) All the check code 2 is written into the first address, and the data 2 is partially written into the first address.

If the writing sequence of the data 2 and the check code 2 in the first copy of the second target data is not limited when the storage device writes the first copy of the second target data into the first address, in addition to the foregoing cases, a case in which the data 2 is partially written into the first address and the check code 2 is partially written into the first address is further included.

For example, FIG. 5 is a schematic diagram of the interrupt event occurring in the process of writing the data into the first address according to an embodiment of this application. FIG. 5 is merely an example, and that there is only the form in FIG. 5 when the interrupt event occurs in the process of writing the data into the first address is not limited. In FIG. 5, before the unilateral RDMA write request is executed, the content stored in the first address is the first target data "1234 CRC1", and the content stored in the second address is also the first target data "1234 CRC1". If the interrupt event occurs in the process of writing the first copy of the second target data "4321 CRC2" into the first address, after the interrupt event occurs, the first target data "1234 CRC1" stored in the first address is partially changed to "4334 CRC1" (that is, the data 1 in the first address is partially changed), and the content stored in the second address remains the first target data "1234 CRC1".

Case 3: The interrupt event occurs after the first copy of the second target data is written into the first address and before the second copy of the target data is written into the second address. In this case, the content stored in the first address is different from the content stored in the second address. Specifically, after the storage device successfully writes the first copy of the second target data into the first address, and before the storage device is about to write the second copy of the second target data into the second address, the interrupt event occurs. In this case, the content stored in the first address is updated to the second target data. The second copy of the second target data is not written into the second address. Consequently, the content stored in the second address is still the first target data.

Figure 6:
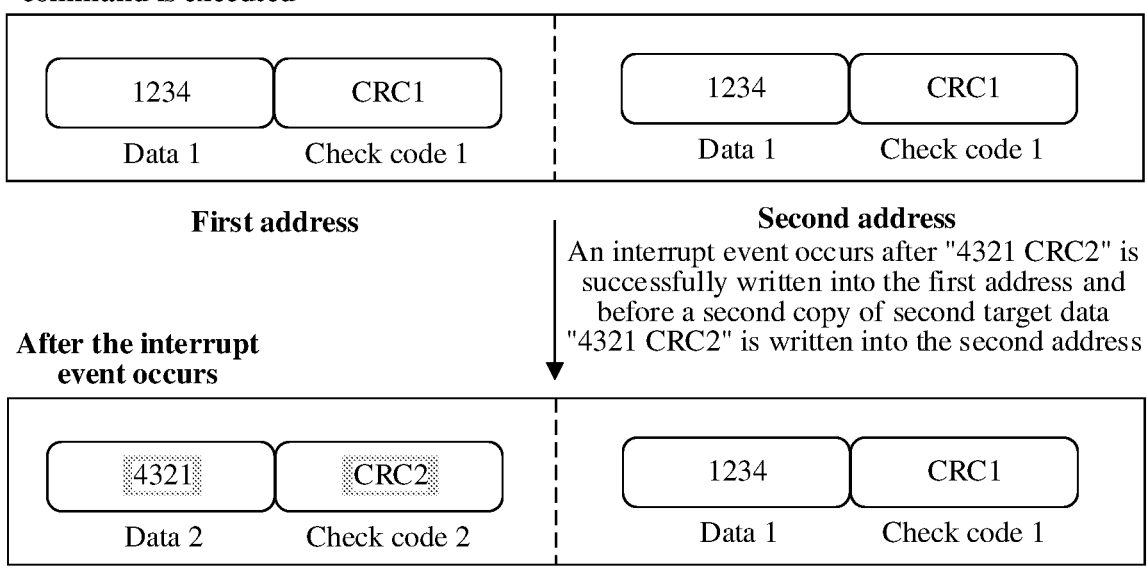
FIG. 6 is a schematic diagram of an interrupt event occurring when data is about to be written into a second address according to an embodiment of this application.

For example, FIG. 6 is a schematic diagram of the interrupt event occurring when the data is about to be written into the second address according to an embodiment of this application. In FIG. 6, before the unilateral RDMA write request is executed, the content stored in the first address is the first target data "1234 CRC1", and the content stored in the second address is also the first target data "1234 CRC1". If the interrupt event occurs after the first copy of the second target data "4321 CRC2" is successfully written into the first address and before the second copy of the second target data is written into the second address, after the interrupt event occurs, the first target data "1234 CRC1" stored in the first address is updated to the second target data "4321 CRC2". Because the second copy of the second target data is not written into the second address, the content stored in the second address remains the first target data "1234 CRC1".

Case 4: The interrupt event occurs in a process of writing the second copy of the second target data into the second address. In this case, the content stored in the first address is different from the content stored in the second address. Specifically, when the storage device successfully writes the first copy of the second target data into the first address, and then is writing a part of the second copy of the second target data into the second address, the interrupt event occurs. In this case, the content stored in the first address is updated from the first target data to the second target data, and the first target data stored in the second address is partially changed.

If the storage device first writes the data 2 and then writes the check code 2 when writing the second copy of the second target data into the second address, that the second target data stored in the second address is partially changed may include the following cases: (1) The data 2 is partially written into the second address, and the check code 2 is not written into the second address. (2) All the data 2 is written into the second address, and the check code 2 is not written into the second address. (3) All the data 2 is written into the second address, and the check code 2 is partially written into the second address.

If the storage device first writes the check code 2 and then writes the data 2 when writing the second copy of the second target data into the second address, that the second target data stored in the second address is partially changed may include the following cases: (1) The check code 2 is partially written into the second address, and the data 2 is not written into the second address. (2) All the check code 2 is written into the second address, and the data 2 is not written into the second address. (3) All the check code 2 is written into the second address, and the data 2 is partially written into the second address.

If the writing sequence of the data 2 and the check code 2 in the second copy of the second target data is not limited when the storage device writes the second copy of the second target data into the second address, in addition to the foregoing cases, a case in which the data 2 is partially written into the second address and the check code 2 is partially written into the second address is further included.

Figure 7:
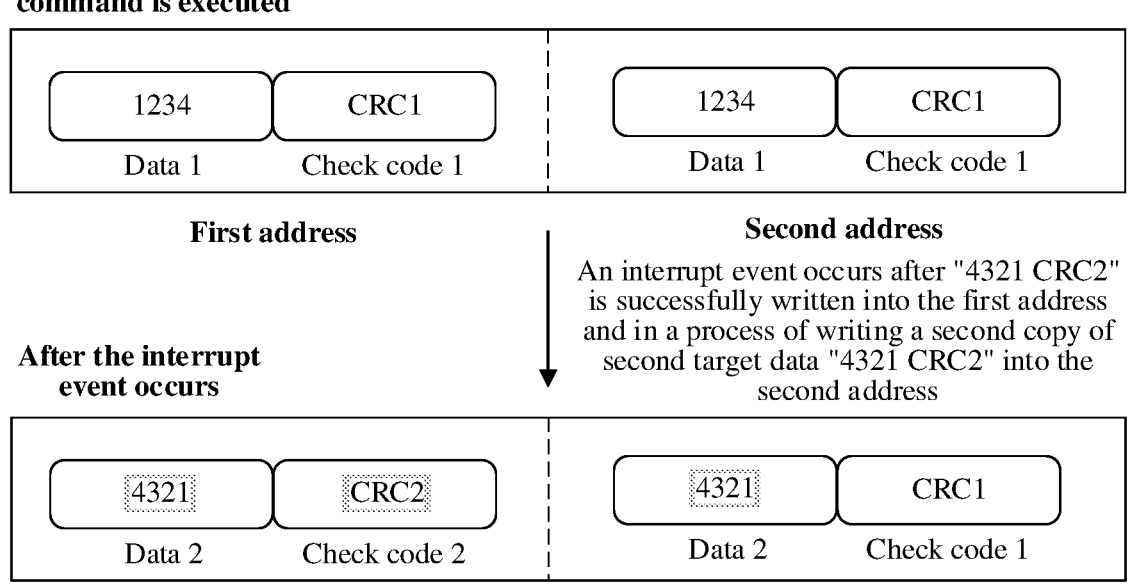
FIG. 7 is a schematic diagram of an interrupt event occurring in a process of writing data into a second address according to an embodiment of this application.

For example, FIG. 7 is a schematic diagram of the interrupt event occurring in the process of writing the data into the second address according to an embodiment of this application. FIG. 7 is merely an example, and that there is only the form in FIG. 7 when the interrupt event occurs in the process of writing the data into the second address is not limited. In FIG. 7, before the unilateral RDMA write request is executed, the content stored in the first address is the first target data "1234 CRC1", and the content stored in the second address is also the first target data "1234 CRC1". If the interrupt event occurs in the process of writing the second copy of the second target data "4321 CRC2" into the second address, after the interrupt event occurs, the first target data "1234 CRC1" stored in the first address is updated to the second target data "4321 CRC2", and the content stored in the second address is partially changed to "4321 CRC1".

Case 5: The interrupt event occurs after the second copy of the second target data is written into the second address. In this case, the content stored in the first address is the same as the content stored in the second address. It may be understood that, in this case, both the two copies of the second target data are successfully written.

Figure 8:
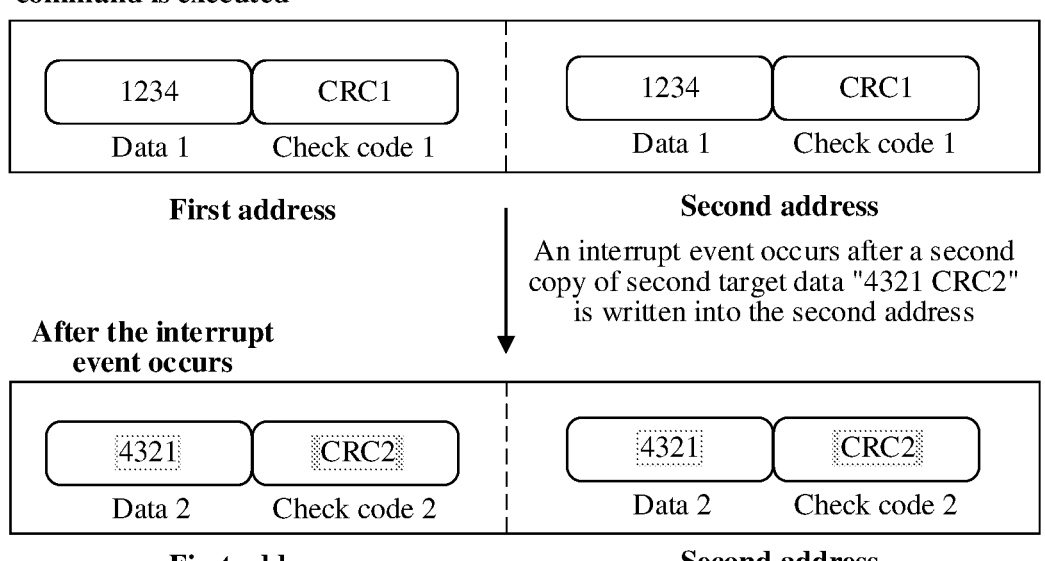
FIG. 8 is a schematic diagram of an interrupt event occurring after data is written into a second address according to an embodiment of this application.

For example, FIG. 8 is a schematic diagram of the interrupt event occurring after the data is written into the second address according to an embodiment of this application. In FIG. 8, before the unilateral RDMA write request is executed, the content stored in the first address is the first target data "1234 CRC1", and the content stored in the second address is also the first target data "1234 CRC1". If the interrupt event occurs after the second copy of the second target data "4321 CRC2" is written into the second address, after the interrupt event occurs, the first target data "1234 CRC1" stored in the first address is updated to the second target data "4321 CRC2". The first target data "1234 CRC1" stored in the second address is also updated to the second target data "4321 CRC2". In other words, the unilateral RDMA write request is successfully executed.

S103: The storage device detects the content stored in the first address and the content stored in the second address.

In this embodiment of this application, a processor or the network interface card of the storage device detects the content stored in the first address and the content stored in the second address.

In this embodiment of this application, after the interrupt event occurs, the storage device detects whether the content in the first address is the same as the content in the second address. If it is detected that the content in the first address is the same as the content in the second address, it indicates that a case in which the two copies of the second target data are written is the foregoing case 1 or 5, it is proved that the atomicity of the data writing is ensured, no additional processing is needed, and a procedure ends. If it is detected that the content stored in the first address is different from the content in the second address, it indicates that a case in which the two copies of the second target data are written is any one of the foregoing cases 2 to 4, it is proved that the atomicity of the data writing cannot be ensured, additional processing is needed, and step S104 is performed.

In this embodiment of this application, detecting whether the content in the first address is the same as the content in the second address is specifically: comparing whether data currently stored in the first address is the same as data currently stored in the second address, and whether check code currently stored in the first address is the same as check code currently stored in the second address.

That the content stored in the first address is the same as the content in the second address means that the data currently stored in the first address is the same as the data currently stored in the second address, and the check code currently stored in the first address is the same as the check code currently stored in the second address. That the content stored in the first address is different from the content in the second address means that the data currently stored in the first address is different from the data currently stored in the second address, and/or the check code currently stored in the first address is different from the check code stored in the second address.

For ease of description, the data currently stored in the first address is referred to as data 3, and the check code currently stored in the first address is referred to as check code 3. The data currently stored in the second address is referred to as data 4, and the check code currently stored in the second address is referred to as check code 4.

For the foregoing cases 2 to 4, that is, when it is detected that the content stored in the first address is different from the content stored in the second address, the content stored in the first address needs to be further checked to determine whether data tearing occurs in the content stored in the first address.

In the case 2 in which the first target data stored in the first address is partially changed but the content stored in the second address remains the first target data because the interrupt event occurs in the process of writing the first copy of the second target data into the first address in S102, the storage device checks the content stored in the first address, specifically, checks the data 3 based on the check code 3. Because the first target data stored in the first address is partially changed in the case 2, any one of the following cases may occur: (1) The data 3 is different from the data 1, but the check code 3 is the same as the check code 1. (2) The data 3 is the same as the data 1, but the check code 3 is different from the check code 1. (3) The data 3 is different from the data 1, and the check code 3 is different from the check code 1. Therefore, for any one of the foregoing cases, detecting of the data 3 based on the check code 3 fails, and it indicates that the data tearing occurs in the content stored in the first address. It may be understood that, because the content stored in the second address remains the first target data in the case 2, it means that the data 4 is the data 1, and the check code 4 is the check code 1. Therefore, detecting of the data 4 based on the check code 4 succeeds, and it indicates that no data tearing occurs in the content stored in the second address.

In the case 3 in which the content stored in the first address is updated to the second target data but the content in the second address remains the first target data because the interrupt event occurs after the first copy of the second target data is written into the first address and before the second copy of the second target data is written into the second address in S102, the storage device checks the content stored in the first address, that is, checks the data 3 based on the check code 3. Because the content stored in the first address has been updated to the second target data, the data 3 is the same as the data 2, and the check code 3 is the same as the check code 2. Therefore, checking of the data 3 based on the check code 3 succeeds, and it indicates that no data tearing occurs in the content stored in the first address.

In the case 4 in which content stored in the first address is updated to the second target data but the first target data stored in the second address is partially changed because the interrupt event occurs in the process of writing the second copy of the second target data into the second address in S102, the storage device checks the content stored in the first address, that is, checks the data 3 based on the check code 3. Because the content stored in the first address is updated to the second target data, the data 3 is the same as the data 2, and the check code 3 is the same as the check code 2. Therefore, checking of the data 3 based on the check code 3 succeeds, and it indicates that no data tearing occurs in the content stored in the first address.

In conclusion, if detecting that the content stored in the first address is different from the content stored in the second address, the storage device further detects whether the data tearing occurs in the content stored in the first address. A detection result shows that: For the case 2 in S102, the data tearing occurs in the content stored in the first address. For the case 3 and the case 4 in S102, no data tearing occurs in the content stored in the first address.

S104: When detecting that the content stored in the first address is different from the content in the second address, the storage device performs a unifying operation on the content stored in the first address and the content stored in the second address.

When the content stored in the first address is different from the content stored in the second address, the storage device performs the unifying operation on the content stored in the first address and the content stored in the second address, so that the content stored in the first address is the same as the content stored in the second address. This ensures the atomicity of the data writing. It should be noted that in this embodiment of this application, the unifying operation may also be referred to as a data overwrite operation.

In specific implementation, if the content stored in the first address is different from the content stored in the second address, and the data tearing occurs in the content stored in the first address and no data tearing occurs in the content stored in the second address, performing the unifying operation on the content stored in the first address and the content stored in the second address is specifically: If the content stored in the second address overwrites the content stored in the first address, and the content stored in the second address remains the first target data, the content stored in the first address is restored to the first target data. In other words, both the content stored in the first address and the content stored in the second address are the data 1 and the check code 1.

Figure 9:
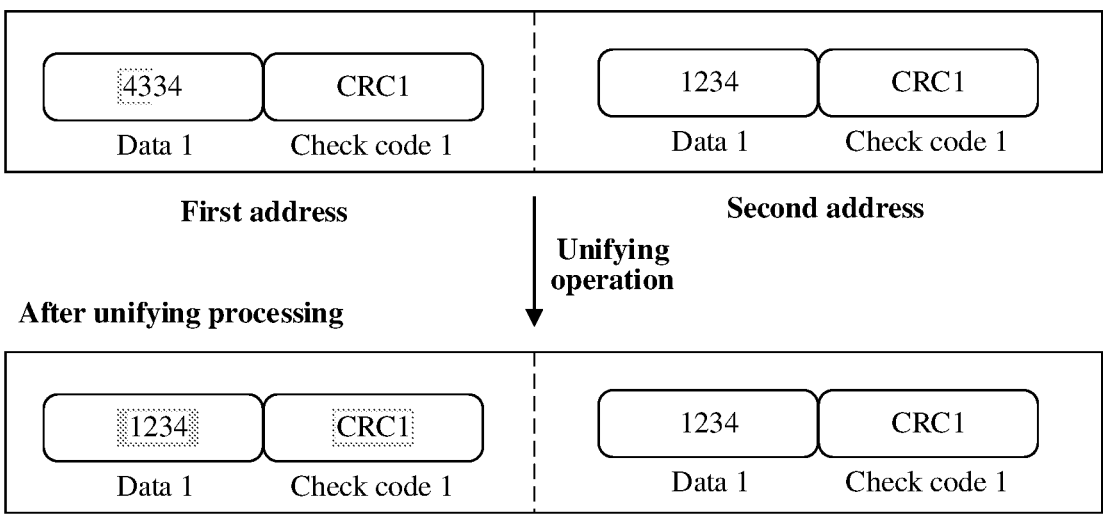
FIG. 9 is a schematic diagram of a unifying operation according to an embodiment of this application.

For example, FIG. 9 is a schematic diagram of the unifying operation according to an embodiment of this application. In FIG. 9, it is assumed that after the interrupt event occurs, the content stored in the first address is "4334 CRC1", in other words, the first target data stored in the first address is partially changed, and the content stored in the second address remains the first target data "1234 CRC1". Because the content stored in the first address is different from the content stored in the second address, and it is detected that the data tearing occurs in the content stored in the first address, the unifying operation is performed. The content stored in the second address is used to overwrite the content stored in the first address. In this case, both the content stored in the first address and the content stored in the second address are the first target data "1234 CRC1".

In specific implementation, if the content stored in the first address is different from the content stored in the second address, and no data tearing occurs in the content stored in the first address, performing the unifying operation on the content stored in the first address and the content stored in the second address is specifically: If the content stored in the first address overwrites the content stored in the second address, and the content stored in the first address is the second target data, the content stored in the second address is updated to the second target data. In other words, both the content stored in the first address and the content stored in the second address are the data 2 and the check code 2.

For example, FIG. 10 is a schematic diagram of the unifying operation according to an embodiment of this application. In FIG. 10, it is assumed that after the interrupt event occurs, the content stored in the first address is "4321 CRC2", that is, the content stored in the first address is updated to the second target data, and the content stored in the second address is "4321 CRC1", that is, the first target data stored in the second address is partially changed. Because the content stored in the first address is different from the content stored in the second address, and it is detected that no data tearing occurs in the content stored in the first address, the unifying operation is performed. The content stored in the first address is used to overwrite the content stored in the second address. In this case, both the content stored in the first address and the content stored in the second address are the second target data "4321 CRC2".

It can be learned that, in this embodiment of this application, continuous dual writing is performed on to-be-written data based on one-time I/O in two addresses that are in the memory of the storage device and that store same content. When a data writing process is interrupted, the unifying operation is performed based on a status of writing the data into the two addresses, so that the content stored in the two addresses is the same. This implements the atomicity of the data writing, reduces I/O consumption, and improves the system performance.

In conclusion, it can be learned that the atomicity of the data writing may be implemented by sequentially writing the to-be-written data into the two addresses in the memory of the storage device in serial. To reduce a data writing delay and further improve data writing efficiency, the client may further sequentially write the to-be-written data into the two addresses in the memory of the storage device by using a unilateral RDMA technology.

It should be noted that data in one computer may be transmitted to another computer based on the RDMA technology by using a network without intervention of operating systems of both parties, to eliminate overheads of copying and moving a data packet in user space and kernel space and context switching, and reduce consumption of bandwidth and computing power of the memory.

FIG. 11 is a flowchart of another data processing method according to an embodiment of this application. Compared with the embodiment in FIG. 3, in FIG. 11, a data write operation is performed by a client instead of the storage device in the embodiment in FIG. 3. FIG. 11 may be independent of the embodiment of FIG. 3. The method includes but is not limited to the following steps.

S201: The client sequentially writes two copies of second target data into a first address and a second address in a memory of the storage device based on a unilateral RDMA technology.

In this embodiment of this application, before the client writes the two copies of the second target data into the storage device, first target data is stored in the first address in the memory of the storage device, and the first target data is also stored in the second address. In other words, content stored in the first address is completely the same as content stored in the second address. It should be noted that for details of the first target data and the second target data, refer to related descriptions of the first target data and the second target data in S101 in the embodiment in FIG. 3. Details are not described herein again.

In this embodiment of this application, the first address is different from the second address.

In this embodiment of this application, the client sequentially and respectively writes the two copies of the second target data into the first address and the second address in the memory of the storage device by using the unilateral RDMA technology. Respectively writing means that the client writes a first copy of the second target data in the two copies of the second target data into the first address in the memory of the storage device to overwrite the first target data in the first address and a second copy of the second target data in the two copies of second target data into the second address in the memory of the storage device to overwrite the first target data in the second address. Sequentially writing means that the client first writes the first copy of the second target data into the first address, and after the first copy of the second target data is successfully written into the first address, the client writes the second copy of the second target data into the second address. It should be noted that, for specific descriptions about a data writing success or failure, refer to related descriptions of S101 in the embodiment in FIG. 3. Details are not described herein again.

In this embodiment of this application, an entity in the client that performs the data write operation may be specifically a network interface card of the client.

It may be understood that, that the client uses the unilateral RDMA technology means that a data write/read operation is performed by the client. In an actual communication process, the client writes data into a target address in the memory of the storage device, and in the data writing process, the storage device does not need to perform any operation. It should be noted that, before using the unilateral RDMA technology, the client pre-obtains the two addresses (for example, the first address and the second address) in the memory of the storage device and permission to use the two addresses.

In specific implementation, the second copy of the second target data in the two copies of the second target data may be obtained by the client by copying the first copy of the second target data. The two copies of the second target data are written into the first address and the second address by the client based on one-time I/O consumption.

S202: If an interrupt event occurs in the data writing process, the storage device detects the content stored in the first address and the content stored in the second address.

In this embodiment of this application, the interrupt event occurs in the data writing process performed by the client. In this case, for details of cases of writing the two copies of the second target data into the first address and the second address in the memory of the storage device, refer to related descriptions of the cases 1 to 5 in S102 in the embodiment in FIG. 3. Details are not described herein again. It should be noted that, a difference from S102 lies in that an execution body of data writing is changed from the storage device in S102 to the client.

In this embodiment of this application, for a specific process in which the storage device detects the content in the first address and the content in the second address, refer to related descriptions of S103 in FIG. 3. For brevity of this specification, details are not described herein again.

S203: When detecting that the content stored in the first address is different from the content stored in the second address, the storage device performs a unifying operation on the content stored in the first address and the content stored in the second address. For details of this step, refer to related descriptions of S104 in FIG. 3. For brevity of the specification, details are not described herein again.

It can be learned that, in this embodiment of this application, to-be-written data is continuously dual written into the two addresses in the memory of the storage device based on one-time I/O by using the unilateral RDMA technology. This can effectively reduce a data writing delay, and improve data writing efficiency. When the data writing process is interrupted, the unifying operation is performed based on a status of writing data into the two addresses, so that the content stored in the two addresses is the same. This implements atomicity of data writing, reduces I/O consumption, and helps improve system performance.

FIG. 12 is a flowchart of still another data processing method according to an embodiment of this application. The embodiment described in FIG. 12 may be independent of embodiments in FIG. 3 and FIG. 11, or may be a supplement to embodiments in FIG. 3 and FIG. 11. The method includes but is not limited to the following steps.

S301: A processor or a network interface card of a client generates a first copy and a second copy of data.

In this embodiment of this application, the first copy is completely the same as the second copy. It should be noted that data is equivalent to the second target data in the embodiment in FIG. 3 or FIG. 11, where the first copy is the first copy of the second target data in the embodiment in FIG. 3 or FIG. 11, and the second copy is the second copy of the second target data in the embodiment in FIG. 3 or FIG. 11.

S302: The network interface card of the client writes the first copy into a first address in a memory of a storage device and the second copy into a second address in the memory in a one-time unilateral RDMA manner.

In specific implementation, the storage device is independent of the client.

In specific implementation, the memory is a persistent memory.

In this embodiment of this application, the network interface card of the client writes the first copy into the first address in the memory of the storage device and the second copy into the second address in the memory in the unilateral RDMA manner. In other words, an execution body of data writing is the client. For details of this step, refer to related descriptions of S201 in the embodiment in FIG. 11. Details are not described herein again.

It should be noted that, for details of a status of writing the first copy into the first address and a status of writing the second copy into the second address, refer to related descriptions of the cases 1 to 6 in S102 in the embodiment in FIG. 3. Details are not described herein again.

In some possible embodiments, S302 may not be performed, and S3021 and S3022 are performed to replace S302.

S3021: The client sends a unilateral RDMA write request to the storage device.

Optionally, after S301, S3021 may be performed.

In this embodiment of this application, the client sends the unilateral RDMA write request to the storage device. Correspondingly, the network interface card of the storage device receives the unilateral RDMA write request.

The unilateral RDMA write request includes the first copy and the second copy of the data, the first address of the first copy in the memory of the storage device, and the second address of the second copy in the memory. It may be understood that the unilateral RDMA write request indicates to write the first copy into the first address in the memory of the storage device and the second copy into the second address in the memory.

S3022: The network interface card of the storage device writes the first copy into the first address and the second copy into the second address according to the unilateral RDMA write request.

It may be understood that S3021 and S3022 also implement writing the first copy of the data into the first address in the memory and the second copy of the data into the second address in the memory. Different from S302, in S3021 and S3022, the execution body of the data writing is the storage device. For details of this embodiment, refer to related descriptions of S101 in the embodiment in FIG. 3. Details are not described herein again.

S303: The processor or the network interface card of the storage device reads the first copy from the first address and the second copy from the second address, checks the read first copy and the read second copy, and when detecting that the read first copy is inconsistent with the read second copy, performs a data overwrite operation on data stored in the first address or data stored in the second address.

In this embodiment of this application, the read first copy includes first data and first check code, the read second copy includes second data and second check code, and the read first copy is inconsistent with the read second copy when at least one of the following conditions is met: the first data is different from the second data, or the first check code is different from the second check code. For a reason why the read first copy is inconsistent with the read second copy, refer to any one of the cases 2 to 4 in S102 in the embodiment in FIG. 3.

In specific implementation, that when it is detected that the read first copy is inconsistent with the read second copy, the data overwrite operation is performed on the data stored in the first address or the data stored in the second address may be: When it is detected that the read first copy is inconsistent with the read second copy, and checking of the first data based on the first check code succeeds, the first data and the first check code overwrite the data stored in the second address. This embodiment corresponds to that the content stored in the first address overwrites the content in the second address in S104 in the embodiment in FIG. 3.

In specific implementation, that when it is detected that the read first copy is inconsistent with the read second copy, the data overwrite operation is performed on the data stored in the first address or the data stored in the second address may be: When it is detected that the read first copy is inconsistent with the read second copy, and checking of the first data based on the first check code fails and checking of the second data based on the second check code succeeds, the second data and the second check code overwrite the data stored in the first address. This embodiment corresponds to that the content stored in the second address overwrites the content stored in the first address in S104 in the embodiment in FIG. 3.

It should be noted that the data overwrite operation is the unifying operation in the embodiment in FIG. 3 or FIG. 11, and an objective of the data overwrite operation is to make the data stored in the first address completely the same as the data stored in the second address.

It should be noted that, a quantity of copies of the data generated by the processor or the network interface card of the client is not limited in this embodiment of this application.

In specific implementation, the processor or the network interface card of the client may also generate three copies of the data, which are respectively the first copy, the second copy, and a third copy. Correspondingly, the network interface card of the client may write the first copy into the first address in the memory of the storage device, the second copy into the second address in the memory, and the third copy into a third address in the memory in the one-time unilateral RDMA manner. Alternatively, the client may send the unilateral RDMA write request to the storage device to indicate the storage device to write the first copy into the first address in the memory, the second copy into the first address in the memory, and the third copy into the third address in the memory according to the RDMA write request. This is not specifically limited in this embodiment of this application. The processor or the network interface card of the storage device reads the first copy from the first address, the second copy from the second address, and the third copy from the third address, and when detecting that two copies in the read first copy, the read second copy, and the read third copy are inconsistent, performs the data overwrite operation on at least one of the data stored in the first address, the data stored in the second address, or data stored in the third address, so that the data stored in the three addresses is the same.

S304: The network interface card of the client reads the first copy from the first address and the second copy from the second address in the unilateral RDMA manner.

S305: The processor or the network interface card of the client checks the read first copy and the read second copy, and determines valid data from the read first copy and the read second copy.

In this embodiment of this application, when detecting that the read first copy is the same as the read second copy, the processor or the network interface card of the client determines that the read first copy and the read second copy are the valid data.

In specific implementation, the read first copy is the same as the first copy of the data, and the read second copy is the same as the second copy of the data. In this case, it indicates that the first copy of the data has been successfully written into the first address in the memory, and the second copy of the data has been successfully written into the second address in the memory. In this way, the processor or the network interface card of the client determines that the read first copy and the read second copy are the valid data. This ensures atomicity of the data writing. It should be noted that, for details of this embodiment, refer to the case 5 in S102 in the embodiment in FIG. 3.

In another specific implementation, the read first copy is the same as initial data stored in the first address in the memory, and the read second copy is the same as initial data stored in the second address in the memory, where the initial data stored in the first address is data stored in the first address before the first copy of the data is written into the first address in the memory, the initial data stored in the second address is data stored in the second address before the second copy of the data is written into the second address in the memory, and the initial data stored in the first address is the same as the initial data stored in the second address. In this way, the processor or the network interface card of the client determines that the read first copy and the read second copy are the valid data. This ensures the atomicity of the data writing. It should be noted that the initial data stored in the first address may be the first target data in the embodiment in FIG. 3, and the initial data stored in the second address is also the first target data in the embodiment in FIG. 3. It should be noted that, for details of this embodiment, refer to the case 1 in S102 in the embodiment in FIG. 3.

It can be learned that, in this embodiment of this application, the two copies of the data are written into the two addresses in the memory of the storage device in the one-time RDMA manner. When it is detected that the data stored in the two memory addresses is inconsistent, the data overwrite operation is performed on the data in a corresponding memory address, so that the data stored in the two memory addresses is the same. This ensures the atomicity of the data writing based on as little I/O consumption as possible, reduces a data writing delay, and improves performance of a storage system.

FIG. 13 is a schematic diagram of a functional structure of an apparatus according to an embodiment of this application. The apparatus 30 includes a generation unit 310 and a writing unit 312. The apparatus 30 may be implemented by hardware, software, or a combination of software and hardware.

The generation unit 310 is configured to generate a first copy and a second copy of data. The writing unit 312 is configured to write the first copy into a first address in a memory of a storage device and the second copy into a second address in the memory in a one-time unilateral remote memory access RDMA manner.

In some possible embodiments, the apparatus 30 further includes a checking unit 314 and a reading unit 316. The reading unit 316 is configured to read the first copy from the first address and the second copy from the second address in the unilateral RDMA manner. The checking unit 314 is configured to: check the read first copy and the read second copy, and determine valid data from the read first copy and the read second copy.

Functional modules of the apparatus 30 may be configured to implement the method described in the embodiment in FIG. 12. In the embodiment in FIG. 12, the generation unit 310 may be configured to perform S301, and the writing unit 312 may be configured to perform S302. The reading unit 316 may be configured to perform S304, and the checking unit 314 may be configured to perform S305. The functional modules of the apparatus 30 may be further configured to implement the methods described in embodiments in FIG. 3 and FIG. 11. For brevity of the specification, details are not described herein again.

Figure 14:
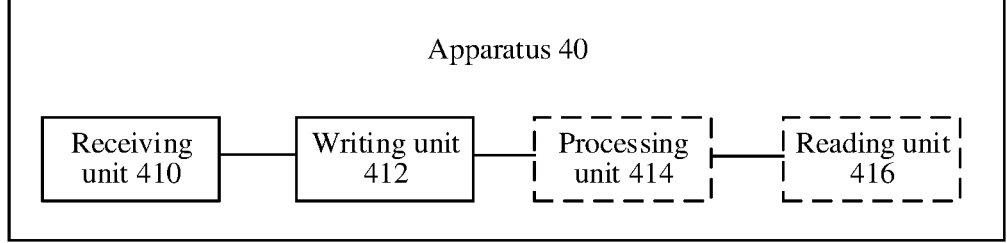
FIG. 14 is a schematic diagram of another functional structure of an apparatus according to an embodiment of this application.

FIG. 14 is a schematic diagram of a functional structure of an apparatus according to an embodiment of this application. The apparatus 40 includes a receiving unit 410 and a writing unit 412. The apparatus 40 may be implemented by hardware, software, or a combination of software and hardware.

The receiving unit 410 is configured to receive a unilateral remote memory access RDMA write request sent by a client, where the unilateral RDMA write request includes a first copy and a second copy of data, a first address of the first copy in a memory of a storage device, and a second address of the second copy in the memory. The writing unit 412 is configured to write the first copy into the first address and the second copy into the second address.

In some possible embodiments, the apparatus 40 further includes a processing unit 414 and a reading unit 416. The reading unit 416 is configured to read the first copy from the first address and the second copy from the second address. The processing unit 414 is configured to: check the read first copy and the read second copy, and when detecting that the read first copy is inconsistent with the read second copy, perform a data overwrite operation on data stored in the first address or data stored in the second address.

Functional modules of the apparatus 40 may be configured to implement the method described in the embodiment in FIG. 12. In the embodiment in FIG. 12, the receiving unit 410 and the writing unit 412 may be configured to perform S3022, and the reading unit 416 and the processing unit 414 may be configured to perform S303. The functional modules of the apparatus 40 may be configured to implement the methods described in embodiments in FIG. 3 and FIG. 11. For brevity of the specification, details are not described herein again.

Figure 15:
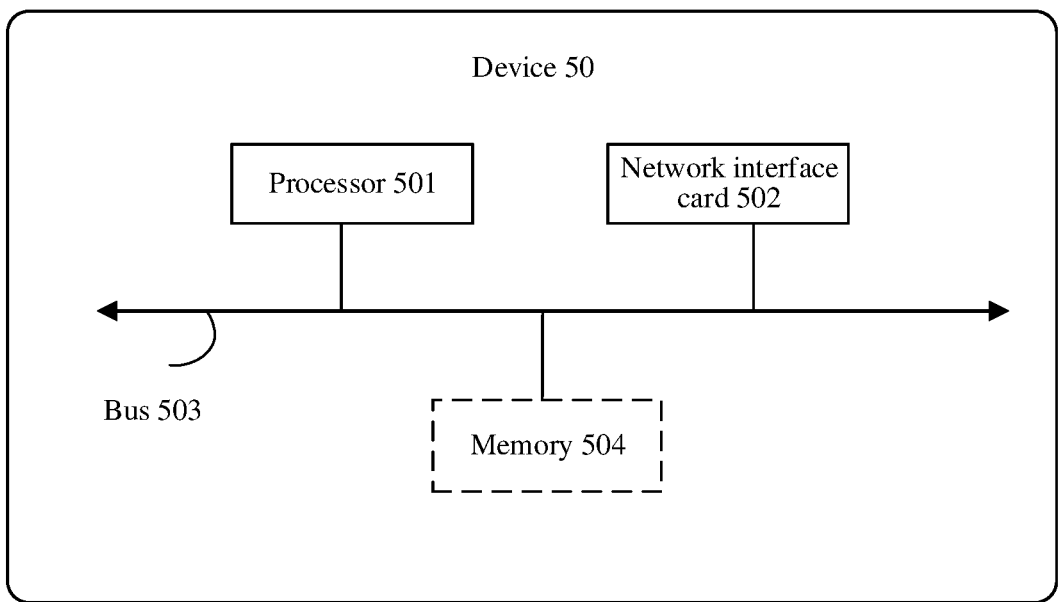
FIG. 15 is a schematic diagram of a structure of another device according to an embodiment of this application.

An embodiment of this application further provides a device. As shown in FIG. 15, the device 50 includes at least a processor 501, a network interface card 502, and a bus 503. The processor 501 and the network interface card 502 communicate with each other through the bus 503. The device 50 may be the foregoing client or storage device. It should be understood that a quantity of processors in the device 50 is not limited in this application.

The bus 503 may be a peripheral component interconnect (peripheral component interconnect, PCI) bus, an extended industry standard architecture (extended industry standard architecture, EISA) bus, or the like. The bus may be classified in an address bus, a data bus, a control bus, and the like. For ease of representation, only one line is used to represent the bus in FIG. 15, but this does not mean that there is only one bus or only one type of bus. The bus 503 may include a path for transmitting information between components (for example, the network interface card 502 and the processor 501) of the device 50.

The processor 501 may include any one or more of processors such as a central processing unit (central processing unit, CPU), a microprocessor (microprocessor, MP), or a digital signal processor (digital signal processor, DSP).

When the device 50 is the foregoing client, the network interface card 502 may be configured to generate a first copy and a second copy of data, and is further configured to write the first copy into a first address in a memory of the storage device and the second copy into a second address in the memory in a one-time unilateral remote memory access RDMA manner. When the device 50 is the foregoing storage device, the network interface card 502 may be configured to receive a unilateral remote memory access RDMA write request sent by the client, where the unilateral RDMA write request includes the first copy and the second copy of the data, the first address of the first copy in the memory of the storage device, and the second address of the second copy in the memory. The network interface card 502 is further configured to write the first copy into the first address and the second copy into the second address.

In specific implementation, when the device 50 is the foregoing client, modules of the device 50 are configured to perform the method on a client side described in the embodiment in FIG. 3, FIG. 11, or FIG. 12.

In a possible design manner, for example, the device 50 may be one or more modules in the client that performs the method shown in FIG. 12, and the device 50 is configured to perform the following operations: generating the first copy and the second copy of the data by using the processor 501 or the network interface card 502; and writing the first copy into the first address in the memory of the storage device and the second copy into the second address in the memory by using the network interface card 502 in the one-time unilateral remote memory access RDMA manner.

In another specific implementation, when the device 50 is the foregoing storage device, the device 50 further includes a memory 504, and the memory 504 may be a persistent memory (Persistent Memory, PMEM) or the like. The modules of the device 50 may be configured to perform the method on a storage device side described in the embodiment in FIG. 3, FIG. 11, or FIG. 12.

In a possible design manner, for example, the device 50 may be one or more modules in the storage device that performs the method shown in FIG. 12, and the device 50 is configured to perform the following operations: receiving, by using the network interface card 502, the unilateral remote memory access RDMA write request sent by the client, where the unilateral RDMA write request includes the first copy and the second copy of the data, the first address of the first copy in the memory 504 of the storage device, and the second address of the second copy in the memory 504; and writing the first copy into the first address and the second copy into the second address by using the network interface card 502.

In the foregoing embodiments in this specification, the descriptions of each embodiment have respective focuses. For a part that is not described in detail in an embodiment, refer to related descriptions in another embodiment.

It should be noted that a person of ordinary skill in the art may see that, all or a part of the steps in each method of the foregoing embodiments may be implemented by a program instructing related hardware. The program may be stored in a computer-readable storage medium. The storage medium includes a read-only memory (Read-Only Memory, ROM), a random access memory (Random Access Memory, RAM), a programmable read-only memory (Programmable Read-only Memory, PROM), an erasable programmable read-only memory (Erasable Programmable Read-Only Memory, EPROM), a one-time programmable read-only memory (One-time Programmable Read-Only Memory, OTPROM), an electrically-erasable programmable read-only memory, (Electrically-Erasable Programmable Read-Only Memory, EEPROM), a compact disc read-only memory (Compact Disc Read-Only Memory, CD-ROM), or another optical disk memory, magnetic disk memory, magnetic tape memory, or any other computer-readable medium that can be configured to carry or store data.

The technical solutions of this application essentially, or the part contributing to the conventional technology, or all or some of the technical solutions may be implemented in a form of a software product. A computer program product is stored in the storage medium and includes several instructions for instructing a device (which may be a personal computer, a server, or a network device, a robot, a single-chip microcomputer, a chip, a robot, or the like) to perform all or some of the steps of the methods described in embodiments of this application.

What is claimed is:

1. A method, comprising:
   generating, by a processor or a network interface card of a client, a first copy and a second copy of data, wherein the processor communicates with the network interface card; and writing, by the network interface card, the first copy of the data into a first address in a memory of a storage device and the second copy of the data into a second address in the memory in a one-time unilateral remote direct memory access (RDMA) manner, wherein writing, by the network interface card, the first copy of the data into the first address and the second copy of the data into the second address in the memory in the one-time RDMA manner comprises writing, in a single RDMA write operation, the first copy of the data to the first address and the second copy of the data to the second address.

2. The method according to claim 1, wherein the memory is a persistent memory.

3. The method according to claim 1, wherein the method further comprises:
   reading, by the network interface card, the first copy of the data from the first address in the unilateral RDMA manner to obtain a read first copy;
   reading, by the network interface card, the second copy of the data from the second address in the unilateral RDMA manner to obtain a read second copy; and
   checking, by the processor or the network interface card, the read first copy and the read second copy, and determining valid data from the read first copy and the read second copy.

4. The method according to claim 3, wherein checking, by the processor or the network interface card, the read first copy and the read second copy, and determining the valid data from the read first copy and the read second copy comprises:
   in response to detecting that the read first copy is the same as the read second copy, determining, by the processor or the network interface card, that the read first copy and the read second copy are the valid data.

5. The method according to claim 3, wherein the single RDMA operation comprises sequentially writing the second copy of the data into the second address after writing the first copy of the data into the first address.

6. The method of claim 1, wherein the single RDMA write operation comprises:
   overwriting, with the first copy of the data, a first copy of second data stored in the first address, wherein a content of the second data is different than a content of the data; and
   overwriting, with the second copy of the data, a second copy of the second data stored in the second address.

7. A client, comprising:
   at least one processor;
   a network interface card configured to communicate with the at least one processor; and
   a first memory, the first memory stores a computer program, that when executed by the at least one processor, causes the client to perform operations comprising:
      generating, by the at least one processor or the network interface card, a first copy of data and a second copy of the data; and
      writing, by the network interface card, the first copy of the data into a first address in a second memory of a storage device and the second copy of the data into a second address in the second memory in a one-time unilateral remote direct memory access (RDMA) manner, wherein writing, by the network interface card, the first copy of the data into the first address and the second copy of the data into the second address in the second memory in the one-time RDMA manner comprises writing, in a single RDMA write operation, the first copy of the data to the first address and the second copy of the data to the second address.

8. The client according to claim 7, wherein the second memory is a persistent memory.

9. The client according to claim 7, wherein the operations further comprise:

reading, by the network interface card, the first copy of the data from the first address in the unilateral RDMA manner to obtain a read first copy;

reading, by the network interface card, the second copy from the second address in the unilateral RDMA manner to obtain a read second copy; and checking, by the processor or the network interface card, the read first copy and the read second copy, and determining valid data from the read first copy and the read second copy.

10. The client according to claim 9, wherein the operations of checking, by the processor or the network interface card, the read first copy and the read second copy, and determining valid data from the read first copy and the read second copy comprises:

in response to detecting that the read first copy is the same as the read second copy, determining, by the processor or the network interface card, that the read first copy and the read second copy are the valid data.

11. The client according to claim 7, wherein the single RDMA write operation comprises sequentially writing the second copy of the data into the second address after writing the first copy of the data into the first address.

12. The client according to claim 7, wherein the single RDMA write operation comprises:

overwriting a first copy of second data stored in the first address with the first copy of the data, wherein a content of the second data is different than a content of the data; and overwriting, with the second copy of the data, a second copy of the second data stored in the second address.

13. A storage device, comprising:

at least one processor;

a network interface card; and a memory, the memory stores a computer program, that when executed by the at least one processor, causes the storage device to perform operations comprising:

receiving, by the network interface card, a single unilateral remote direct memory access (RDMA) write request sent by a client, wherein the single unilateral RDMA write request comprises a first copy of data, a second copy of the data, a first address corresponding to the first copy of the data in the memory of the storage device, and a second address corresponding to the second copy of the data in the memory; and writing, by the network interface card according to the single unilateral RDMA write request, the first copy of the data into the first address and the second copy of the data into the second address in a single RDMA write operation.

14. The device according to claim 13, wherein the memory is a persistent memory.

15. The device according to claim 13, wherein in response to determining that an interrupt occurs during writing the first copy of the data into the first address and the second copy of the data into the second address, the operations further comprise:

reading, by the network interface card or the at least one processor, the first copy of the data from the first address to obtain a read first copy;

reading, by the network interface card or the at least one processor, the second copy of the data from the second address to obtain a read second copy; and checking, by the network interface card or the at least one processor, the read first copy and the read second copy, and in response to detecting that the read first copy is inconsistent with the read second copy, performing a data overwrite operation on first data stored in the first address or second data stored in the second address.

16. The device according to claim 15, wherein the read first copy comprises the first data and first check code, the read second copy comprises the second data and second check code, and the read first copy is inconsistent with the read second copy when the first data is different from the second data.

17. The device according to claim 15, wherein the read first copy comprises the first data and first check code, the read second copy comprises the second data and second check code, and the read first copy is inconsistent with the read second copy when the first check code is different from the second check code.

18. The device according to claim 15, wherein the operations of performing the data overwrite operation on the first data stored in the first address or the second data stored in the second address comprises:

in response to checking of the first data based on a first check code of the read first copy succeeding, overwriting the second data stored in the second address with the first data and the first check code.

19. The device according to claim 18, wherein the operations of performing the data overwrite operation on data stored in the first address or data stored in the second address comprises:

in response to checking of the first data based on the first check code failing and checking of the second data based on a second check code of the read second copy succeeding, overwriting the first data stored in the first address with the second data and the second check code.

20. The device according to claim 13, wherein the operations of writing, by the network interface card, the first copy of the data into the first address and the second copy of the data into the second address according to the unilateral RDMA write request comprises:

writing the second copy of the data into the second address after writing the first copy of the data into the first address.

* * * * *